United States Patent [19]

Hausrath

[11] Patent Number: 5,730,487
[45] Date of Patent: Mar. 24, 1998

[54] DEVICE FOR CONTROLLING THE MOVEMENT OF A COVER OF A VEHICLE SLIDING ROOF

[75] Inventor: Udo Hausrath, Hadorf, Germany

[73] Assignee: HS Products AG, Systemtechnik und Produktmanagement, Krailling, Germany

[21] Appl. No.: 553,496

[22] PCT Filed: Jun. 17, 1994

[86] PCT No.: PCT/EP94/01984

§ 371 Date: Nov. 17, 1995

§ 102(e) Date: Nov. 17, 1995

[87] PCT Pub. No.: WO95/00350

PCT Pub. Date: Jan. 5, 1995

[30] Foreign Application Priority Data

Jun. 17, 1993 [DE] Germany ............ 43 20 106.7

[51] Int. Cl.$^6$ ............................................ B60J 7/047
[52] U.S. Cl. ............................ 296/223; 256/216; 256/224
[58] Field of Search ................................ 296/223, 224, 296/216, 220

[56] References Cited

U.S. PATENT DOCUMENTS 4,746,165  5/1988  Fuerst et al. .................. 296/223 X
5,447,355  9/1995  Kelm ................................. 296/223

FOREIGN PATENT DOCUMENTS 39 19 385 C1  7/1990  Germany.
40 01 759 C1  4/1991  Germany.
40 31 750 C2  5/1992  Germany.
42 00 725 C2  5/1994  Germany.

*Primary Examiner*—Dennis H. Pedder
*Attorney, Agent, or Firm*—Evenson, McKeown, Edwards & Lenahan, PLLC

[57] ABSTRACT

A device for controlling the movement of a cover of a vehicle sliding roof includes a guide track (6) along which a carriage (3) is adapted to be moved with a driving cable (20). A swing-out pin (7) is provided on the carriage (3) for engaging with a slotted link (9) joined to the cover (8) and relocating the cover (8) by an angular movement (lifting movement) with respect to the longitudinal axis of the vehicle whilst shifting in the swing-out slotted link (9). A swivelling lever (2), joined to the cover (8) via a cover holder (1), is swivelled by the angular movement of the cover (8) into a locking position restraining the carriage from movement counter-directed to the lifting movement.

15 Claims, 7 Drawing Sheets

DEVICE FOR CONTROLLING THE MOVEMENT OF A COVER OF A VEHICLE SLIDING ROOF

FIELD OF THE INVENTION

The invention relates to a device for controlling the movement of a cover for a vehicle sliding roof.

BRIEF SUMMARY OF THE INVENTION

With the invention, self-acting locking is achieved for the roof until the lifting movement thereof is ended.

Furthermore, a defined axis of rotation or defined pivotal point is positionally determined on the front edge of the cover during the angular movement when swinging outwards (lifting movement).

A raising of the front edge of the cover from the seal portion when the roof aperture is opened is achieved before the cover is shifted, and a lowering of the front edge into the seal portion is achieved after the closing movement.

A rocking lever combines the operations of cooperation during the positional determination of the cover pivotal point on the front edge of the cover, raising and lowering of the cover, and creation of the restraint from attendant movement of the roof when swinging outwards so that they are achieved with one single constructional component.

When the front edge of the cover is raised, the rear edge of the cover is slightly lowered, so that during its longitudinal displacement with respect to the roof surface of the motor vehicle the cover has a very flat angle of rise or extends substantially parallel to the roof surface.

BRIEF DESCRIPTION OF THE DRAWINGS

An example of embodiment of the invention is illustrated in the Figures. These show.

DETAILED DESCRIPTION OF THE INVENTION

Figure 7:
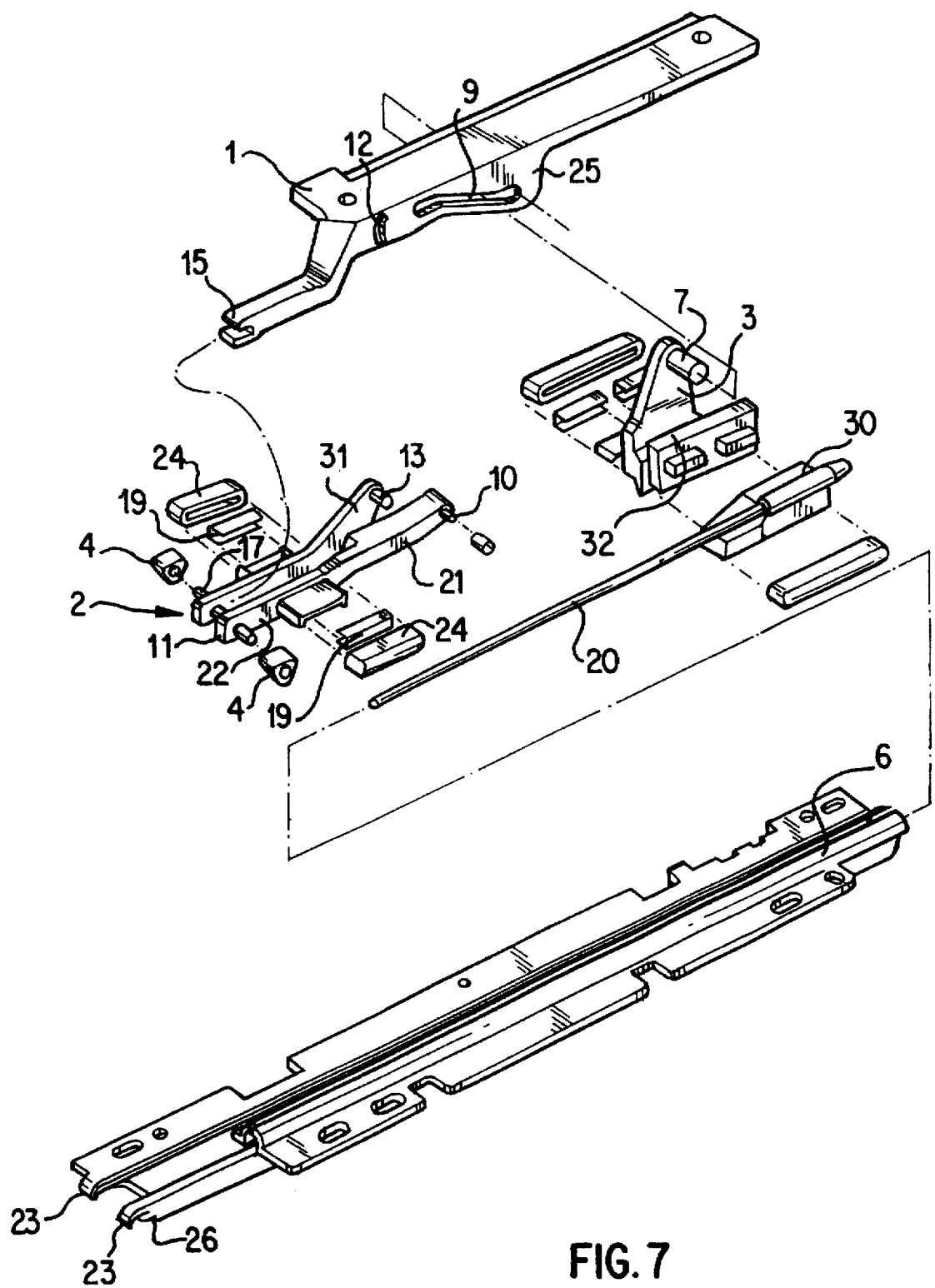
FIG. 7: an exploded view of the essential component parts of the example of embodiment.

As is evident particularly from the exploded view of the example of embodiment in FIG. 7, the device for controlling the movement of a vehicle sliding roof cover 8 (FIG. 1–4) has a cover holder 1. In the cover holder 1 a swing-out slotted link 9 is provided into which a swing-out pin 7 on a carriage (transport carriage) 3 projects. Furthermore, a control slotted link 12 is provided on the cover holder. Into this projects a control pin 13 of a swivelling lever 2 guided in a longitudinal guide track 6 (guide rail). The control slotted link extends at approximately a right angle to the longitudinal direction and has a small curvature or a slight bend. Sliding blocks 19 are mounted on both sides of the swivelling lever 2 for guiding the swivelling lever 2 and may consist of a rubber base body. Sliding caps 24 of plastic are placed on the elastic sliding blocks 19. The elastic sliding blocks form a bearing pivot 14 (sliding bearing pivot) for the swivelling lever 2 which is slidable within the longitudinal guide track 6 (FIGS. 1–4).

The swivelling lever 2 is thus formed as a two armed lever. The first lever arm 21 has at its end a lock actuating member in the form of a locking pin 10. The second lever arm 22 possesses at its front end a lifting means designed as a rocking device in the form of rocking levers 4 disposed on both sides. The rocking levers are one-armed levers and possess a shaped part 28 which may be rounded or designed as a roller. The rocking levers cooperate with guide means 23 having the form of front guide faces, offset from the horizontal, on the guide rail 6.

The swing-out slotted link 9 and the control slotted link 12 are provided in a guide portion 25, projecting vertically downwards, of the cover holder 1 that has a horizontal mounting plate. The swing-out slotted link 9 has the substantial portion thereof extending inclinedly downwards from the front to the rear and thus determines the lifting motion (swing-out motion) of the cover 8. A receiving fork 15 is provided at the front end of the guide portion 25 to receive the front end of the swivelling lever 2. For this, a bearing pin is provided at the front end of the swivelling lever 2 to form a locating axis 17. The rocking levers 4 are also pivotally supported on both-sided extensions of the bearing pin extending along the axis 17.

The carriage 3 can be driven for movement in the guide rail 6 with the aid of a crank handle or an electric motor drive. The drive is transmitted via a driving cable 20. On the driving cable 20 a sliding block 30 is located that is inserted into the transport carriage 3 for transmission of the movement.

A further movement control member is provided on the swivelling lever 2 in the form of the control pin 13. This is located on a further lever arm 31 at the side of the first lever arm 21. The control pin 13 is joined to the swivelling lever 2 in such manner that it engages in the control slotted link 12 at the guide portion 25 of the cover holder 1. Friction-diminishing rollers may be provided on the locking pin 10 as well as on the control pin 13.

During movement of the transport carriage 3 in the guide rail 6 a combined operation results from the engagement of the swing-out pin 7 in the swing-out slotted link 9, from the engagement of the control pin 13 in the control slotted link 12, from the reception of the front lever arm end 11 in the receiving fork 15 on the guide portion 25, and from the locking pin 10 in such manner that in a first retracted position, with the cover 8 swung-out (FIG. 2), the mechanical components are locked to each other, and with further displacement of the carriage (FIG. 3) the cover front edge 27 is raised by the swivelling lever 2. In this, the pivotal point of the swing-out movement (movement from FIG. 1 to FIG. 2) is shifted to the cover front edge 27.

Various operating positions of the transport carriage 3 and the swivelling lever 2 coupled therewith, and of the functional members disposed thereon are described in more detail with reference to the FIGS. 1 to 4.

By actuation of the hand crank or electric drive the transport carriage 3 sliding in the guide rail 6 is moved via the driving cable 20. The transport carriage 3 engages through the swing-out pin 7 with the swing-out slotted link 9 of the cover holder. The cover holder 1 and the cover 8 are raised at the rear by the longitudinal movement of the transport carriage 3 (FIG. 2) via this swing-out slotted link 9.

The pivotal point of this lifting movement of the cover 3 is located on the cover front edge 27 and is formed with the aid of the control slotted link 12 and the receiving fork 15 in the cover holder. In this, the control pin 13 moves in the control slotted link 12 from an upper position (FIG. 1) into a middle position (FIG. 2) in which the control slotted link has a slight bend. During the lifting movement the locking pin 10 is retained in the locking position by a guide track 32 on the transport carriage 3. In this position the locking pin 10 urges the rocking lever 4 with its rocking lever portion 28 around the pivotal point 14 of the sliding block bearing of the swivelling lever 2 into an opening 26 at the front end of the guide rail 6. This prevents the cover 8 on the transport carriage 3 from being taken along in the longitudinal direction during the lifting movement of the cover 8. This is achieved by the swivel lever 2 and the cover holder joined thereto being retained at their front end by the rocking lever 4. Hereby the restraint of the longitudinal movement of the cover 8 during the swing-out is achieved by self-acting locking.

After the end of this swing-out movement the swing-out pin 7 in the swing-out slotted link 9 abuts against the rear stop (FIG. 2), and the control pin 13 is located at the bend position in the control slotted link 12. The cover 8 can maintain this swung-out position.

During a further longitudinal movement the transport carriage 3 takes with it the swivelling lever 2 in the longitudinal direction via the cover holder 1 and the control pin 13 brought into the lowest position in the control slotted link 12. At the beginning of the longitudinal movement of the cover the swivelling lever 2 also tilts around the bearing pivot 14 with the locking pin 10 downwards, and with the rocking lever bearing pivot, lying on the receiving axis 17 at the lever end 11, upwards. The locking pin 10 plunges downwards behind the end of the guide track 32 of the transport carriage 3 and is drawn-in below a guide ridge 16 (FIG. 3, 4) of the guide rail 6. In this position, the transport carriage 3 is clamped to the swivelling lever 2 via the cover holder 1.

Figure 1:
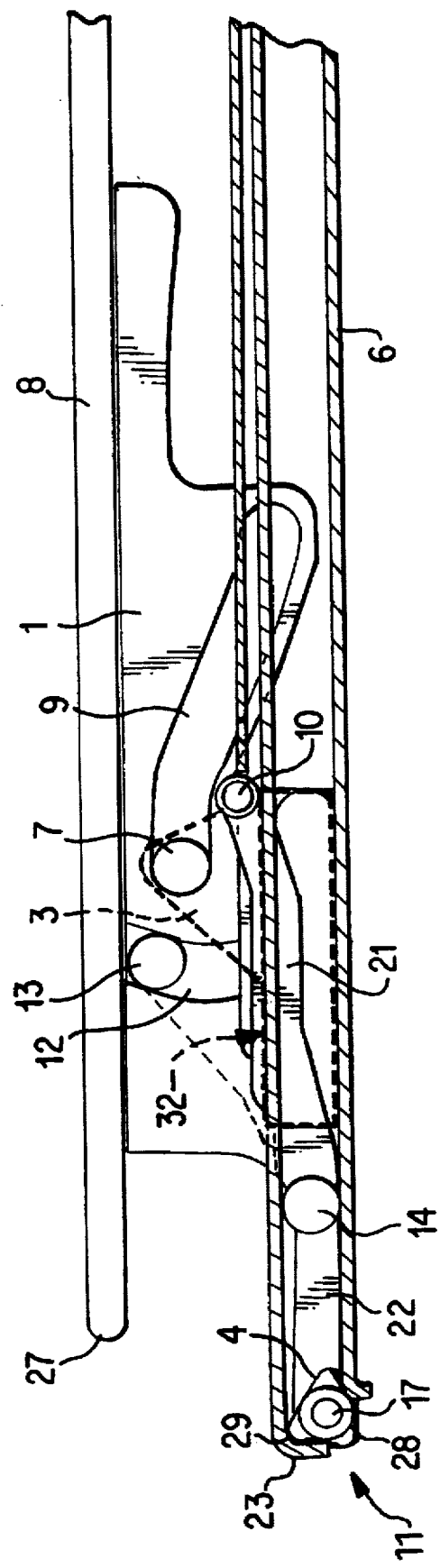
FIGS. 1 to 4: various operational positions of the device for controlling the cover movement.
Figure 2:
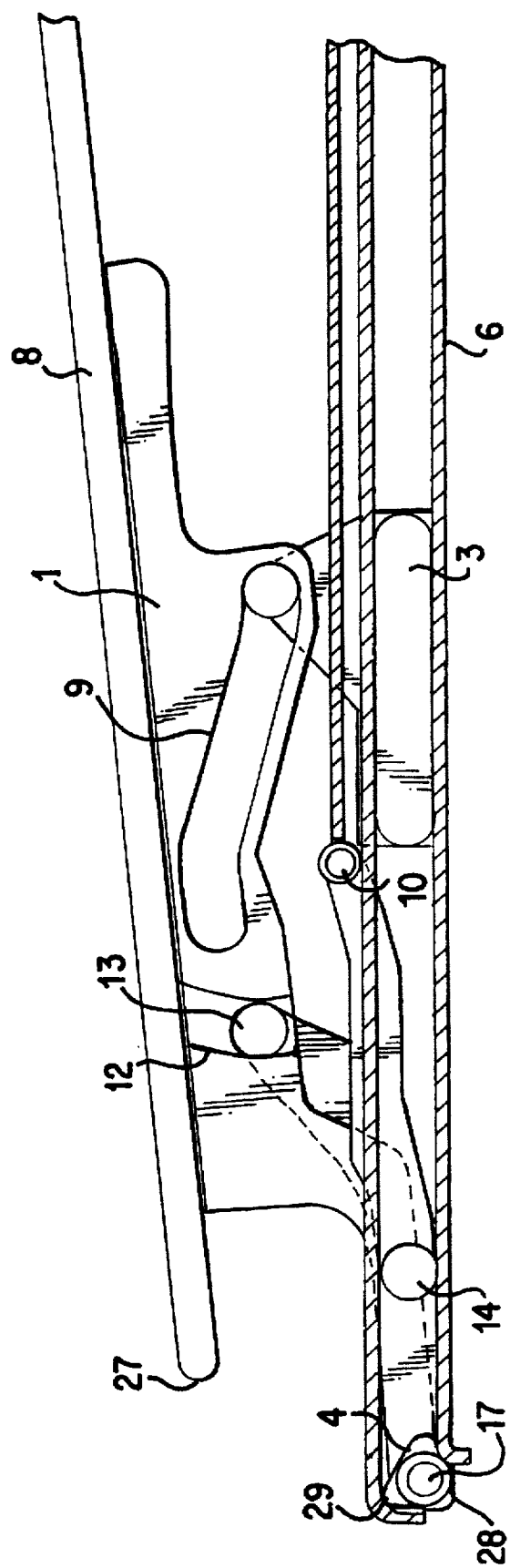
Figure 3:
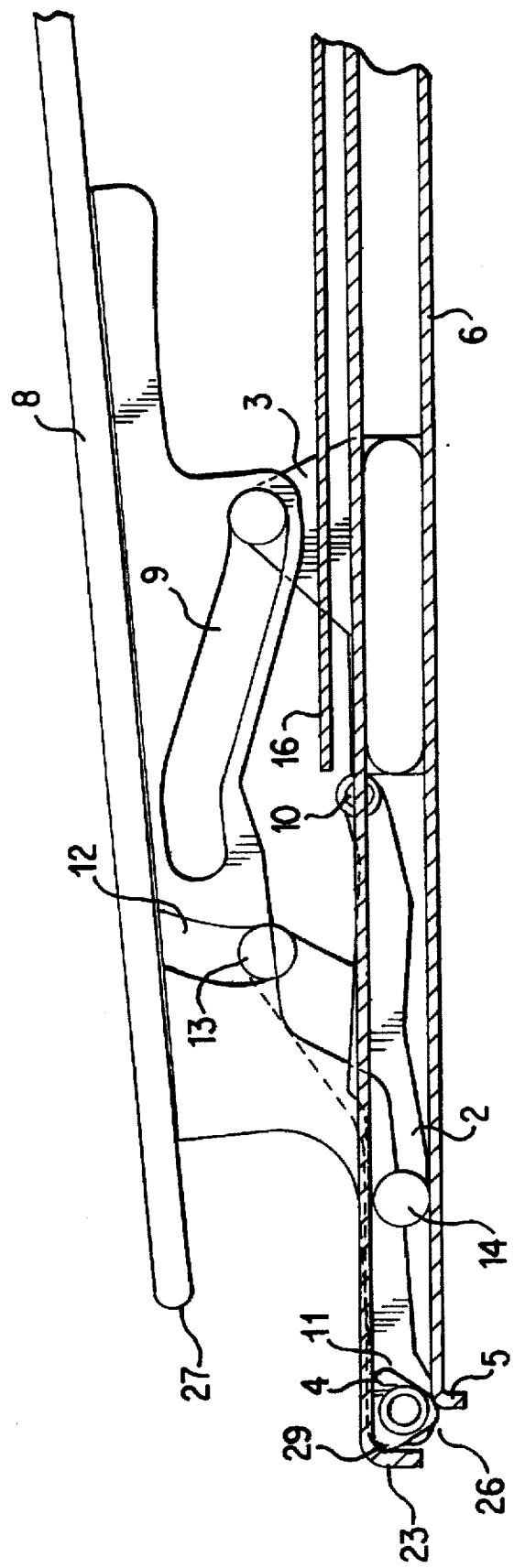
Figure 4:
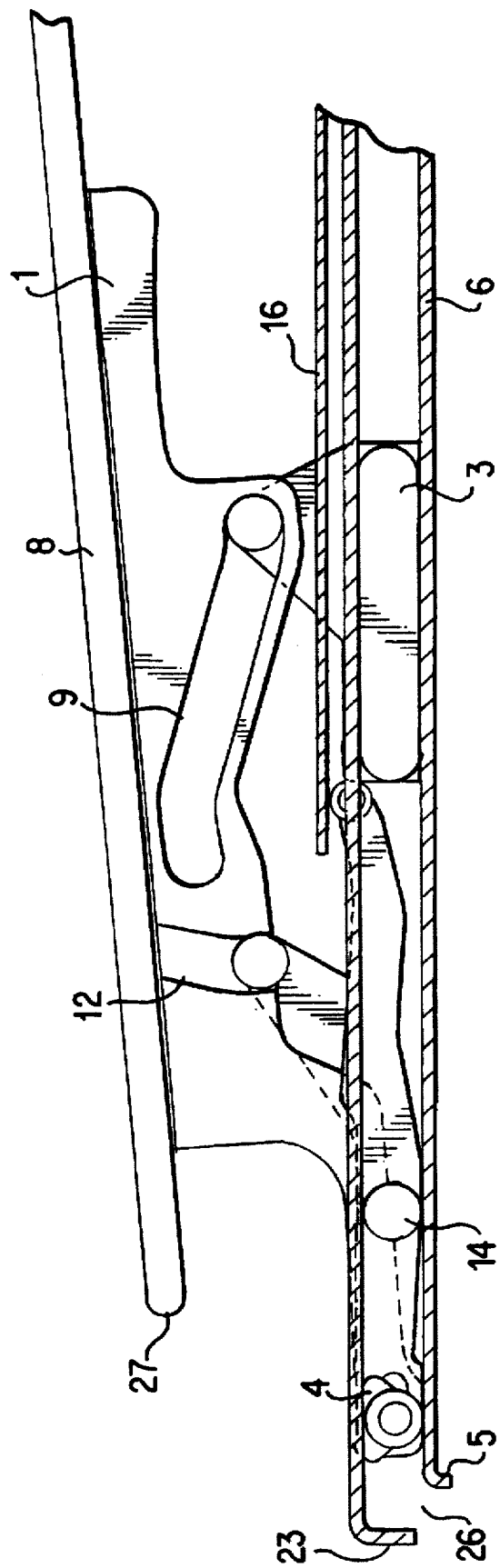

This first longitudinal and rocking movement of the swivelling lever 2 is produced by the rocking lever 4 and the rocking lever portion 28 which, for example, is designed as a rocking lever roller or formed on the same piece, pivotally supported on the pin extending along the locating axis 17 of the swivel lever. In this, the rocking lever 4 cooperates with inclined or rectangularly offset guide means at the front end of the guide rail 6. In the illustrated example of embodiment the guide means are formed by a rectangularly offset portion 23 of the upper, horizontally extending rail portion of the guide rail 6 and a lower, rectangularly offset rail portion 5. The opening 26 is formed between both rail portions at the beginning of the guide rail 6. In the corner between the upper, horizontally extending rail portion of the guide rail 6 and the offset rail portion 23 a bearing pivot for the rocking lever 4 is formed which forms a pivotal point 29 for the swivelling movement or rocking movement of the rocking lever 4 during the movement from the position of FIGS. 1 and 2 into the position of FIG. 3. During this movement the rocking lever portion 28 located in the opening 26 in FIGS. 1 and 2 is lifted out of the opening 26. The pivotal point 29 is located above the pivotal point or the bearing pivot 14 of the two-armed swivelling lever 2. The rectangularly offset front guide rail ends 5 and 23 may both or each singly also have an inclined shape for defining the opening 26. During the movement of the rocking lever 4 from the position illustrated in FIGS. 1 and 2 into the position illustrated in FIG. 3, the front lever arm end 11 of the two-armed swivelling lever 2 is raised. Hereby the front edge 27 of the cover 8 is also raised with simultaneous lowering of the rear portion of the cover 8.

Figure 5:
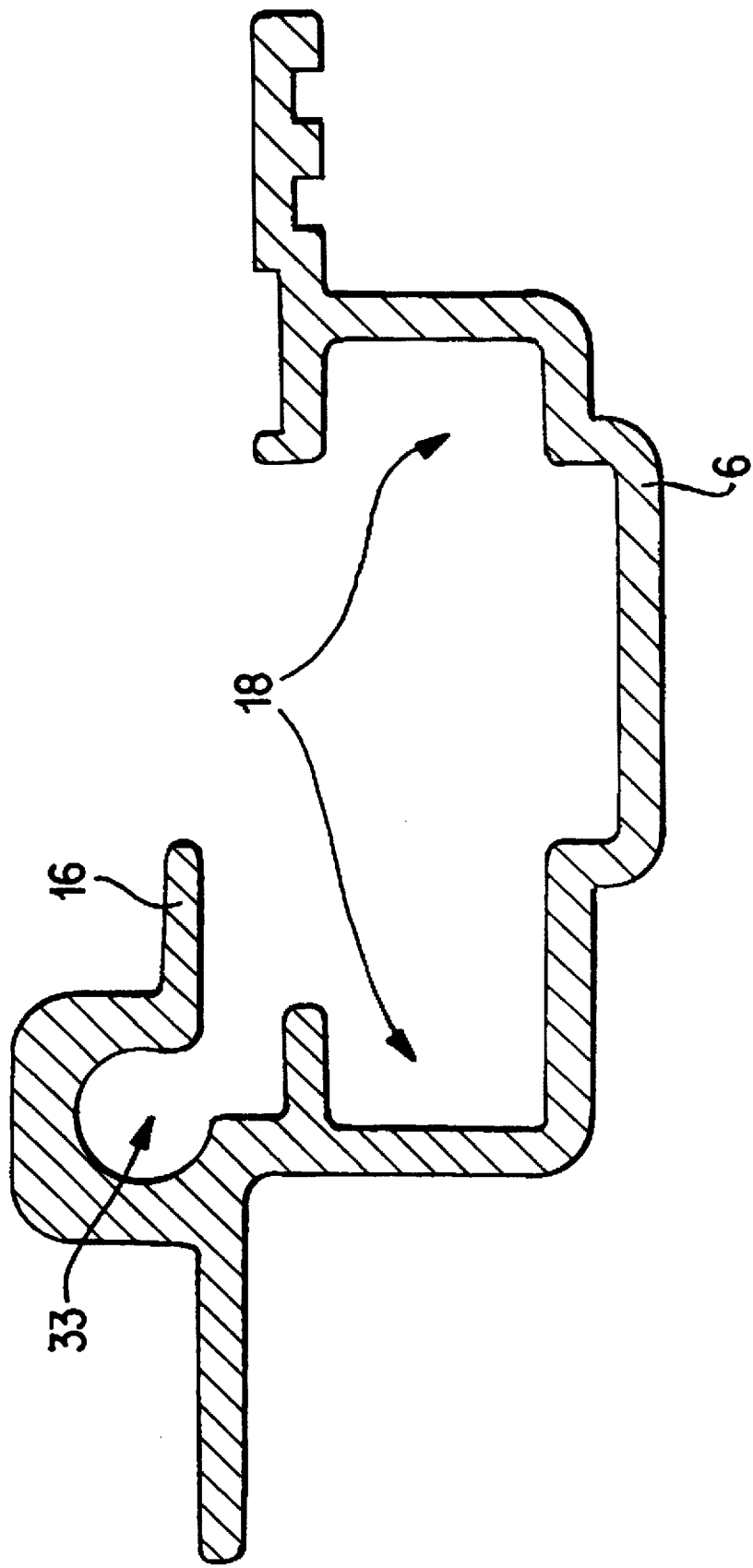
FIG. 5: a cross-section through a guide track for the carriage movement.
Figure 6:
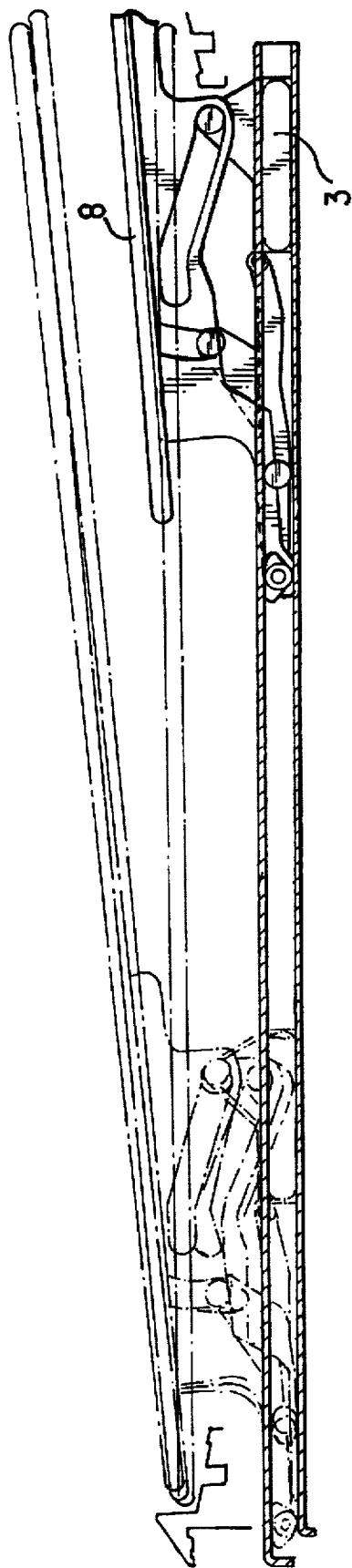
FIG. 6: an overall view of the control device in which various cover positions and positions, in particular the two end positions, are shown.

During further longitudinal displacement of the carriage 3 in the direction towards the end position illustrated in FIG. 6, the transport carriage 3, the sliding caps 24 which together with the sliding blocks 19 form the bearing pivot 14 of the swivelling lever 2, and the rocking lever 4 move along guide tracks 18 (FIG. 5) of the guide rail 6. The driving cable 20 extends along a guide channel 33. The locking pin 10 slides along the guide ridge 16.

The rocking lever 4 is in an upwardly abutting position in the rail 6 and rests against the horizontal surface of the rail 6. Thereby the rocking lever 4 with the rocking lever portion 28 slides without resistance by any impeding portion the guide rail 6 as far as the rear end position shown in FIG. 6 in which the cover 8 is removed from the roof aperture.

I claim:

1. A device for controlling the movement of a vehicle sliding roof cover comprising:

a guide track, a carriage coupled to the sliding roof cover and movable along said guide track, a drive means for driving said carriage, lifting means for swivelling the sliding roof cover around a bearing axis into a raised position, and a guide means for guiding a cover front edge of the sliding roof cover for pivoting movement when swivelling the sliding roof cover around the bearing axis and imparting to the cover front edge a lifting movement during a transition between swivelling and longitudinal shifting movement of the cover, wherein said guide means includes a swivelling lever and a guide portion of a cover holder joining said swivelling lever to said sliding roof cover, and said swivelling lever includes a lock actuating member cooperating with the carriage during the lifting movement of the cover front edge to restrain a longitudinal shift of the cover.

2. A device according to claim 1, wherein the swivelling lever is designed as a two-armed lever having a first lever arm with said lock actuating member, said lock actuating member resting against the carriage to hold the swivelling lever in its position and restrain the longitudinal shift of the cover during the lifting movement.

3. A device according to claim 2, wherein while swivelling the sliding roof cover, a second lever arm of the two-armed lever, together with a control slotted link on the cover holder in which a control pin joined to the swivelling lever engages, positionally determines a pivotal point of the pivoting movement.

4. A device according to claim 3, wherein the lock actuating member is provided at the end of the first lever arm, and an end of the second lever arm is locked to the guide track to restrain the longitudinal shift.

5. A device according to claim 3, wherein the lifting means includes a swing-out pin provided on the carriage for engaging in a swing-out slotted link joined to the sliding roof cover and shifting in the swing-out slotted link to relocate said sliding roof cover during said pivoting movement.

6. A device according to claim 5, wherein the end of the second lever arm and the control pin, which is guided in the control slotted link, positionally determine said pivotal point during shifting of the swing-out pin in the swing-out slotted link.

7. A device according to claim 3, and further comprising guide elements provided on the guide track, the second lever arm being raised around a bearing pivot when the longitudinal shifting movement of the sliding roof cover begins and being lowered around said bearing pivot at an end of a closing movement.

8. A device according to claim 7, wherein said guide means includes a rocking lever cooperating with the guide elements and provided at an end of the second lever arm for controlling the lifting movement of the cover front edge.

9. A device according to claim 8, wherein the rocking lever is swivelled during said lifting movement.

10. A device according to claim 1, wherein the swivelling lever has a bearing supported on the guide track.

11. A device according to claim 3, and further comprising a receiving fork for joining the cover holder to an end of the second lever arm.

12. A device according to claim 2, wherein the carriage is engaged with the lock actuating member during part of a closing movement.

13. A device according to claim 9, wherein the guide track has an opening in which a formed-on portion of the rocking lever is held when the cover is closed and until the pivoting movement of the cover has been completed to restrain the longitudinal shift of the cover.

14. A device according to claim 13, wherein the guide track also defines a pivotal point for the rocking lever.

15. A device according to claim 14, wherein the pivotal point is located above a bearing of the swivelling lever which is supported on the guide track.

* * * * *